O. ZERK.
OILER.
APPLICATION FILED FEB. 23, 1912.
1,246,215.
Patented Nov. 13, 1917.
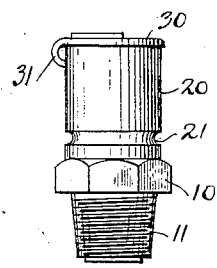
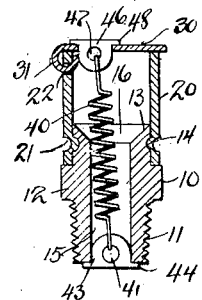
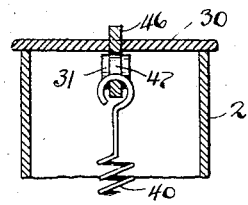
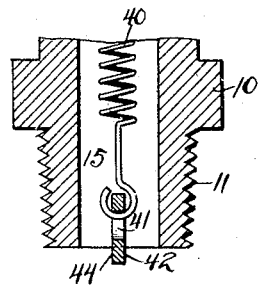
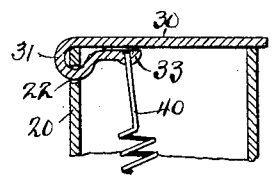
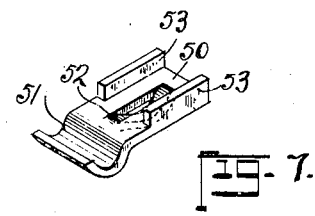
WITNESSES
INVENTOR
Oscar Zerk,
BY Albert H. Baker,
ATTORNEY

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

OILER.

1,246,215.  Specification of Letters Patent.  Patented Nov. 13, 1917.

Application filed February 23, 1912. Serial No. 679,506.

*To all whom it may concern:*

Be it known that I, OSCAR ZERK, a subject of the Emperor of Austria, residing at Cleveland, in the county of Cuyahoga and State of Ohio, have invented a certain new and useful Improvement in Oilers, of which the following is a full, clear, and exact description, reference being had to the accompanying drawings.

The object of this invention is to provide a very simple and cheap, and at the same time, effective device for conveying oil to a bearing. My oiler is especially well adapted for embodiment in a small device adapted to be screwed into an opening leading to a bearing surface. One of the features of my oiler is that it is self closing, having a cap or lid which is normally held shut by a spring within the oiler. Another feature is that the portion of the oiler which carries the cap may be swiveled on the stationary portion to enable the oiler to take the most convenient position for the opening of the cap and the filling of the oiler. The invention consists of the combinations of coöperating parts by which I effect the desired results, as herein illustrated and hereinafter more fully explained.

In the drawings, Figure 1 is a side elevation of my oiler; Fig. 2 is a vertical section thereof; Figs. 3 and 4 are enlarged vertical sections at right angles to Fig. 2 through the devices for anchoring the upper and lower ends of the spring, respectively; Fig. 5 is a detail showing a modified form for anchoring the upper end of the spring; Fig. 6 is a detail of another form of anchorage for the upper end of the spring and hinge for the top; Fig. 7 is a perspective of the hinging and anchoring clip shown in Fig. 6.

As shown in Figs. 1 and 2, 10 indicates the base portion of the oiler, which is formed with an external thread 11 by which it may be screwed into a threaded opening. Above this the base portion has an outward flange 12 and above this a projection 13 with an annular recess 14. Internally, the base portion has a bore 15 flaring outwardly at its upper portion, as shown at 16. The wall or body of the oiler consists of a cylindrical member 20 which surrounds the base portion 13 and substantially abuts the upper face of the flange 12. An annular bead 21 is pressed into the outside of the wall which bends the metal thereof on the inner side of the wall into the recess 14. By this means the wall is locked to the base against separation therefrom but may be turned thereon as desired. Accordingly, the wall is swiveled to the base.

30 indicates the cap or lid of the oiler. This is a disk having at one edge a tongue 31 which is rolled into an eye passing through an opening 22 near the top of the wall. This makes a very simple hinge for the cap.

To make the oiler self closing, I provide an internal helical tension spring connected with the base and cap. This spring is designated 40. It is preferably made of a piece of wire having hooks at its opposite ends. The lower hook extends through the eye 41 in a member 42 secured to the base and the upper end is suitably secured to the cap. The member 42 which secures the spring to the base is preferably a flat sheet metal stamping, as shown in Figs. 2 and 4. Its upper portion 43 is substantially the diameter of the bore 15, while below this it is extended in opposite directions forming a head 44, which is adapted to engage the under face of the body portion. The extent of the head, however, is small enough so that it does not interfere in any way with the body being screwed into the suitable receiving opening.

The anchorage for the upper end of the spring may be similar to that just described for the lower end. It is so shown in Figs. 2 and 3 and consists of a flat sheet metal stamping 46 having a body portion occupying a slot in the cap and an eye 47 below the cap which is occupied by the upper hook of the spring. Above the cap is an extended head 48 resting on the top of the cap.

In place of the construction just described I may, if desired, secure the upper end of the spring to the cap or lid, by extending the hinged tongue 31 of the cap farther inwardly and hooking the spring over it, as illustrated at 33 in Fig. 5.

Or, in place of either form, I may make the tongue a separate member secured to the lid, as shown in Figs. 6 and 7. In that case I prefer to take a sheet metal member 50, having a trough-like portion 51, a downward bow 52 and upturned ears 53 and pass such ears through openings in the lid, upsetting them above the top. This enables the trough 51 with the lid to make a hinge eye, while the bow 52 makes a convenient loop for receiving the hooked end of the spring.

It will be seen that my oiler is very simple in construction and may be very neat in appearance. There is nothing about it to get out of order and it is effective in holding the lid closed while enabling it to be opened, whenever desired, for the insertion of oil. The swiveling enables the body of the oiler to be turned to bring the lifting edge of the cap on the side of the device most convenient for inserting the oil.

Having thus described my invention, what I claim is:

1. In an oil cup, a base, a body surrounding the base and connected thereto and having independent turning movement thereon, a lid hinged to the body for closing the outer end thereof, a device having parts abutting against the lowermost edge of the base and another part projecting within the bore of the latter, and a spring connected at its opposite ends to the lid and to the part of said device projecting within the bore of the base, said device being held in position by the spring, substantially as described.

2. In an oil cup, a body having an open end, and an opening through its side wall adjacent said end, a lid for closing the body, a spring associated with the lid and a member for connecting the lid to the body and the spring to the lid, said member having a part extending through said opening in the side wall of the body.

3. In an oil cup, a body having an open end, a lid for closing said end, a spring for yieldingly holding the lid in closed position and means for pivotally connecting the lid to the body and the spring to the lid comprising a plate having parts extending through the lid, an eye for engaging the spring, and an additional part coacting with the side wall of the body.

4. In an oil cup, a body having an open end and an opening through its side wall, a lid for closing the open end of the body, a spring tending to hold the lid in closed position, and a member for connecting the lid to the body and the spring to the lid, said member comprising a plate having a centrally depressed portion forming an eye, lugs at its side edges extending through the lid, and a deflected end portion coöperating with the said opening in the side wall of the body.

5. In an oiler, the combination of a base having a depending projection on the bottom thereof formed with an internal bore, a wall rising from the base, the wall being provided with a transverse opening therethrough near its upper end, a lid, means associated with the lid and extending through said opening for hinging the lid to said wall, and a tension spring within the oiler and connected at its upper end with said means, substantially as and for the purpose set forth.

6. In an oil cup, a base, a body mounted on the base, a lid for the body, the lid being formed with a perforation, a spring for closing the lid and means connecting the spring and the lid, including a member extending through the perforation in the lid and having a portion overlying the upper face of the lid and also having an eye located below the lid through which the end of the spring is passed, substantially as and for the purpose set forth.

In testimony whereof, I hereunto affix my signature in the presence of two witnesses.

OSCAR ZERK.

Witnesses:
ALBERT H. BATES,
GERTRUDE K. SMITH.

Copies of this patent may be obtained for five cents each, by addressing the "Commissioner of Patents, Washington, D. C."